United States Patent
Melanson

(10) Patent No.: US 9,425,725 B2
(45) Date of Patent: Aug. 23, 2016

(54) POSITION ESTIMATION SYSTEM AND METHOD FOR AN ELECTRIC MOTOR

(71) Applicant: Cirrus Logic, Inc., Austin, TX (US)

(72) Inventor: John Laurence Melanson, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 446 days.

(21) Appl. No.: 13/780,466

(22) Filed: Feb. 28, 2013

(65) Prior Publication Data

US 2014/0239863 A1    Aug. 28, 2014

(51) Int. Cl.
*H02P 21/00* (2016.01)
*H02P 6/18* (2016.01)

(52) U.S. Cl.
CPC ...................... *H02P 6/182* (2013.01)

(58) Field of Classification Search
CPC ........................................... H02P 21/00
USPC ................................ 318/400.34, 400.01, 700
See application file for complete search history.

(56) References Cited

U.S. PATENT DOCUMENTS

| | | | |
|---|---|---|---|
| 6,483,270 B1 * | 11/2002 | Miyazaki | G05B 19/231 318/609 |
| 6,885,163 B2 | 4/2005 | Heidrich | |
| 6,982,534 B2 | 1/2006 | Hahn et al. | |
| 7,026,772 B2 * | 4/2006 | Quirion | H02P 6/181 318/400.02 |
| 7,042,180 B2 | 5/2006 | Terry et al. | |
| 7,122,980 B2 | 10/2006 | Kuroshima et al. | |
| 7,274,161 B2 | 9/2007 | Mori et al. | |
| 7,486,037 B2 | 2/2009 | Noh | |
| 7,489,097 B2 | 2/2009 | Fu et al. | |
| 7,602,139 B2 * | 10/2009 | Ho | H02P 6/185 318/400.02 |
| 7,944,163 B2 | 5/2011 | Okumura | |
| 8,018,188 B2 | 9/2011 | Schwarzkopf et al. | |
| 8,040,095 B2 | 10/2011 | Berto | |
| 8,054,024 B2 | 11/2011 | Hayashi et al. | |
| 2003/0034755 A1 * | 2/2003 | Krefta | F02N 11/00 318/801 |
| 2003/0107337 A1 * | 6/2003 | Kokami | H02P 6/182 318/400.07 |
| 2003/0128009 A1 * | 7/2003 | Sakurai | H02P 6/18 318/722 |
| 2004/0012354 A1 * | 1/2004 | Krefta | F02N 11/00 318/400.41 |
| 2008/0100243 A1 * | 5/2008 | Kurosawa | G11B 19/2054 318/430 |
| 2010/0060217 A1 | 3/2010 | Ikeda et al. | |

(Continued)

OTHER PUBLICATIONS

Texas Instruments, "Designing High-Performance and Power-Efficient Motor Control Systems," B. Novak and B. Akin, Jun. 2009.

(Continued)

*Primary Examiner* — Kawing Chan
(74) *Attorney, Agent, or Firm* — Steven Lin, Esq.

(57) ABSTRACT

Systems and methods of estimating a motor position of a motor are disclosed. One exemplary system and method involve observing motor currents of the motor at two different times. Average motor voltages of the motor are determined between the two different times. Average back electro motive force (BEMF) values of the motor are calculated between the two different times. The BEMF values are in conformity with the observed motor currents and the average motor voltages. Another exemplary system and method for estimating a rotor position of a motor involve a motor position estimator that receives information from the motor and estimates a rotor position for a future time. The future time corresponds approximately to a desired target current, 24 Claims, 3 Drawing Sheets

(56) References Cited

U.S. PATENT DOCUMENTS

| | | |
|---|---|---|
| 2010/0194329 A1 | 8/2010 | Lu et al. |
| 2010/0207562 A1 | 8/2010 | Spirk et al. |
| 2011/0050209 A1 | 3/2011 | Nase |
| 2012/0249033 A1 | 10/2012 | Qin |
| 2013/0033212 A1* | 2/2013 | Hong ............... H02P 6/182 318/400.35 |
| 2014/0265964 A1* | 9/2014 | Yersin ............... H02P 6/182 318/400.26 |

OTHER PUBLICATIONS

Wang, et al, "A Position Detection Strategy for Sensorless Surface Mounted Permanent Magnet Motors at Low Speed Using Transient Finite-Element Analysis," IEEE Trans. on Magnetics, vol. 48 No. 2, pp. 1003-1006 (Feb. 2012).

Johnson et al, "Review of Sensorless Methods for Brushless DC," IEEE, pp. 143-150 (1999).

Ogasawara et al, "An Approach to Position Sensorless Drive for Brushless DC Motors," IEEE, pp. 443-447 (1990).

Holtz, "Initial Rotor Polarity Detection and Sensorless Control of PM Synchronous Machines," IEEE, pp. 2040-2047 (2006).

Chang et al, "A New Sensorless Starting Method for Brushless DC Motors without Reversing Rotation," IEEE, pp. 619-624 (2007).

Personn et al, "A New Standstill Position Detection Technique for Nonsalient Permanent-Magnet Synchronous Motors Using the Magnetic Anisotropy Method," IEEE Transaction on Magnetics, col. 43, No. 2, pp. 554-560 (Feb. 2007).

Nakashima et al, "Sensorless Initial Rotor Position Estimation of Surface Permanent-Magnet Synchronous Motor," IEEE Transaction on Industry Applications, vol. 36, No. 6, p. 1598 (Nov./Dec. 2000).

Tanaka et al, "Initial Rotor Position Estimation for Surface Permanent Magnet Synchronous Motor," IEEE, p. 2592 (2001).

Tursini et al, "Initial Rotor Position Estimation Method for PM Motors," IEEE Transactions on Industry Applications, vol. 39 No. 6, pp. 1630-1640 (Nov./Dec. 2003).

Lee et al, "A New Starting Method of BLDC Motors Without Position Sensor," IEEE Transactions of Industry Applications, vol. 42, No. 6, p. 1532 (Nov./Dec. 2006).

Lee et al, "A New Starting Method of BLDC Motors without Position Sensor," IEEE, pp. 2397-2402 (2004).

Ha et al, "Sensorless Field-Orientation Control of an Induction Machine by High-Frequency Signal Injection," IEEE Transactions on Industry Applications, vol. 35 No. 1, pp. 45-51 (Jan./Feb. 1999).

Jeong et al, "Initial Rotor Position Estimation of an Interior Permanent-Magnet Synchronous Machine Using Carrier-Frequency Injection Methods," IEEE Transactions on Industry Applications, vol. 41 No. 1, pp. 38-45 (Jan./Feb. 2005).

Wijenayake et al, "Modeling and Analysis of Permanent Magnet Synchronous Motor by Taking Saturation and Core Loss into Account," IEEE, pp. 530-534 (1997).

Schmidt et al, "Initial Rotor Angle Detection of a Non-Salient Pole Permanent Magnet Synchronous Machine," IEEE Industry Application Society Annual Meeting, pp. 459-463 (Oct. 1997).

Jang et al, "Position Detection and Start-up Algorithm of a Rotor in a Sensorless BLDC Motor Utilising Inductance Variation," IEE Proc.- Electr. Power Appl., vol. 149, No. 2 (Mar. 2002).

Nakashima et al, "Sensorless Initial Rotor Position Estimation of Surface Permanent Magnet Synchronous Motor," IEEE, pp. 525-527 (1999).

Sugawara et al, "A Novel and Simple Initial Rotor Position Detecting Method for PMSMs," IEEE PEDS, pp. 612-617 (2005).

Li et al, "Modeling of Cross-Coupling Magnetic Saturation in Signal-Injection-Based Sensorless Control of Permanent-Magnet Brushless AC Motors," IEEE Transactions on Magnetics, vol. 43 No. 6, pp. 2552-2554 (Jun. 2007).

Consoli et al, "Sensorless Control of PM Synchronous Motors at Zero Speed," IEEE, pp. 1033-1040 (1999).

Ichikawa et al, "Sensorless Control of Permanent-Magnet Synchronous Motors Using Online Parameter Identification Based on System Identificiation Theory," IEEE Transactions on Industrial Electronics, vol. 53 No. 2, pp. 363-372 (Apr. 2006).

Scaglione et al, "PM Motor Sensorless Position Detection based on Iron B—H Local Hysteresis," Electrical Machines and Systems (ICEMS), 1999 International Conference on, pp. 1-6.

Hung et al, "Fuzzy Gain Scheduling PI Controller for a Sensorless Four Switch Three Phase BLDC Motor," IEEE, pp. 420-424 (2010).

* cited by examiner

POSITION ESTIMATION SYSTEM AND METHOD FOR AN ELECTRIC MOTOR

FIELD OF INVENTION

The present invention generally relates to motor controllers, and, more particularly, to a method and system of estimating a position of an electric motor for a motor controller. The motor is assumed to be of the permanent magnet type, with two or more phase windings in the stator

BACKGROUND OF THE INVENTION

A motor control system and methodology require that the position of the motor (e.g., positions of the rotor angles) be determined, known, derived, and/or estimated. One way of determining motor position is by using a sensor as part of the motor control system. However, a sensor adds to the costs, hardware, and space consumption of the overall motor control system, Another way of determining motor position is by using a sensorless motor control approach. The sensorless motor control approach does not use a sensor to sense the position of the motor but instead typically uses an observer. The observer is herein defined as an operational block, device, or system that determines the motor position as a function of the electrical input/output ("I/O") of the motor. They have been developed to avoid at least some of the issues that sensors typically add. A sensorless motor control approach generally involves at least two main operations: 1) roughly estimating the motor position (e.g., where the rotor angle is) and 2) rotationally smoothing the rough estimates (e.g., by using a rotational smoother). A rotational smoother is generally defined as a lowpass filter applied to a value the modulus domain, viz. an angle that proceeds from 0 to 360 degrees, and then starts again at 0 degrees.

FIG. 1 shows a conventional sensoriess, field-oriented control (FOC) motor control system 100 in accordance with the prior art. Motor control system 100 generally includes a motor controller 102, a power supply 112, an inverter 114, and a motor 116. The motor 116 is typically a permanent magnet synchronous motor (PMSM) or brushless direct current (BLDC) motor. The motor controller 102 generally comprises a field-oriented control (FOC) algorithm block 104, an inverse Clarke converter 105, a pulse width modulation (PWM) controller block 106, and an observer 108. The inverse Clarke converter 105 performs inverse Clarke transformations on the outputs from FOC algorithm block 104. The motor controller 102 further includes a Clarke converter 109 for respectively receiving three signals from motor 116 and performing Clarke transformations thereon. The Clarke converter 109 converts the three input signals from motor 116 to two output signals. The two output signals from the Clarke converter 109 are fed into a Park converter 110 for performing Park transformations which are complex rotations.

During operation, the PWM controller block 106 of motor controller 102 provides continuous PWM signals to control inverter 114 so that inverter 114 can provide commanded voltage to each phase of motor 116 from power supply 112. Motor controller 102 provides control of motor 116 through the application of PWM signals from PWM controller block 106 based on the FOC algorithm in FOC algorithm block 104. Observer 108 determines the rotor position or angle and provides an angle signal to the Park converter 110 and PWM controller 106.

However, problems do exist with the use of conventional, sensorless FOC motor controls. For example, system 100 is complex and typically requires simultaneous current and/or voltage measurements. Because of these required simultaneous current and/or voltage measurements, observer 108 is therefore required to perform intensive computational processes and algorithms involving complex mathematics and calculations. Thus, observer 108 is typically limited from a computational process standpoint. Also, a conventional system may employ multiple observers, and these multiple observers will compete with each other in ways that can ultimately impact system performance. Furthermore, another major problem with observer 108 is that there exists a lot of noise sensitivity due to sampling in the conventional system and thus accuracy and clarity of what is observed by observer 108 is impacted. Observer 108 also requires the use and sensing of both motor voltage V and motor current I and thus the observation process of what observer 108 is trying determine from the motor voltages and currents may not be that straight forward.

An exemplary, prior art conventional motor control system that uses an observer is disclosed in U.S. Patent Application Publication No. US2012/0249033 to inventor Ling Qin entitled "Sensorless Motor Control" (hereafter referred to as '033 Patent Application). Paragraph 0005 of the '033 Patent Application further cites exemplary conventional motor control systems with observers in accordance with the prior art.

With respect to sensorless motor control systems, another way of handling the estimating and smoothing of the estimations of the rotor position is by using a sliding mode observer. The sliding mode observer both performs the estimation and smooths the estimated positional values. The Texas Instruments' (TI) white paper entitled "Designing High-Performance and Power-Efficient Motor Control Systems" by Brett Novak and Bilal Akin dated June 2009 provides an example of such a sliding mode observer (e.g., referred to as SMOPOS in the TI white paper). Yet another way of handling the estimating and smoothing operations is using a position estimator to do the position estimates and then use a phase-locked loop ("PLL") to do the smoothing of the positional estimated values.

SUMMARY OF THE INVENTION

An exemplary system and method of estimating a motor position of a motor are disclosed. The system and method involve observing motor currents of the motor at two different times. Average motor voltages of the motor are determined between the two different times. Average back electro motive force (BEMF) values of the motor are calculated between the two different times. The BEMF values are in conformity with the observed motor currents and the average motor voltages. The average BEMF values can be calculated by calculating a change in the motor current between the two different times.

The average motor voltages can be calculated from a pulse width modulation (PWM) duty cycle of a PWM drive. The average motor voltages can be observed with an analog-to-digital converter (ADC) that takes at least two samples during a period between the two different times for one of the average motor voltages. An analog integrator for the ADC can be used to integrate a signal for the average motor voltages at a PWM rate of a PWM drive. The ADC can be a delta-sigma modulator. At least two ADCs can be used to observe multiple phases of the motor.

The system and method can also involve a rotational smoother for rotationally smoothing the average BEMF values. The rotational smoother can be a phase locked loop (PLL) filter. The PLL filter can further comprise a phase detector. The phase detector calculates a rotation of each of the average BEMF values through use of a complex rotation value and calculates a phase error based on the rotated value. The phase error is proportionate to an imaginary part divided by a real part of the rotated value.

Another exemplary system and method for estimating a rotor position of a motor are disclosed. This other exemplary system and method involve a motor position estimator that receives information from the motor and estimates a rotor position for a future time, wherein the future time corresponds approximately to a desired target current.

The motor position estimator can further comprise a back electro motive force (BEMF) estimator for receiving information from the motor. The BEMF estimator can receive current and voltage information of the motor. The system and method can further comprise a phase locked loop ("PLL") block coupled to the motor position estimator. The PLL block can estimate the rotor position for a future time wherein a sampling period is defined between a present time and a time when a voltage phase operation started and wherein the future time is defined by an approximate sampling period that is approximately the sampling period and is based on a difference between a time later than the present time and the time when the voltage phase operation stated.

The PLL block can further comprise a rotor position predictor. The rotor position predictor can further comprise a phase detector and a proportionate integrator loop. The rotor position predictor can estimate the rotor position for the future time and can use estimates of prior rotor positions to determine the rotor position for the future time. The rotor position prediction can also use phase and frequency information related to the estimates of the prior rotor positions to determine a phase of the motor corresponding to the rotor position for future time.

DETAILED DESCRIPTION

Figure 1:
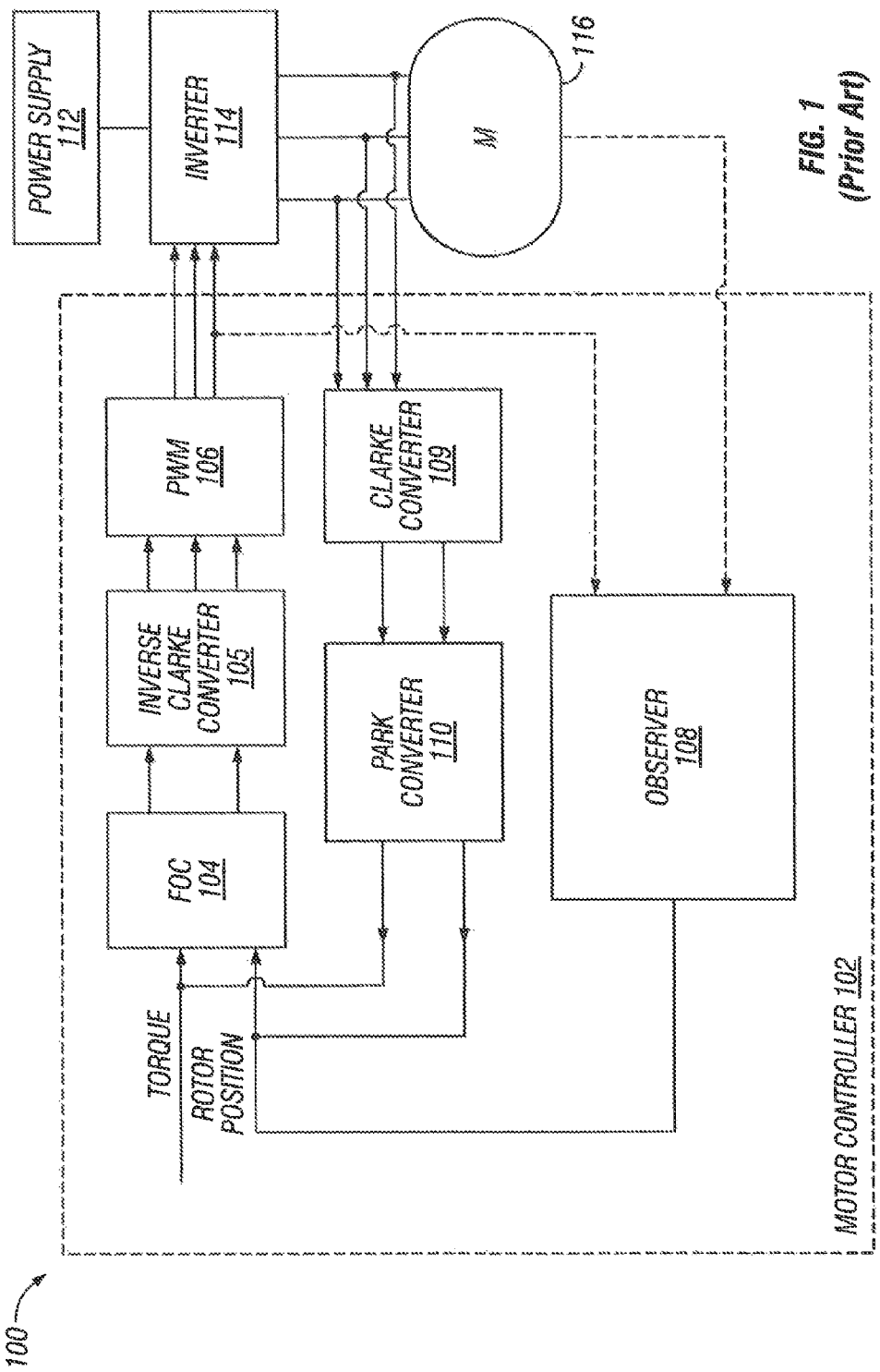
FIG. 1 is a conventional sensorless, field-oriented control (FOC) motor control system in accordance with the prior art.
Figure 2:
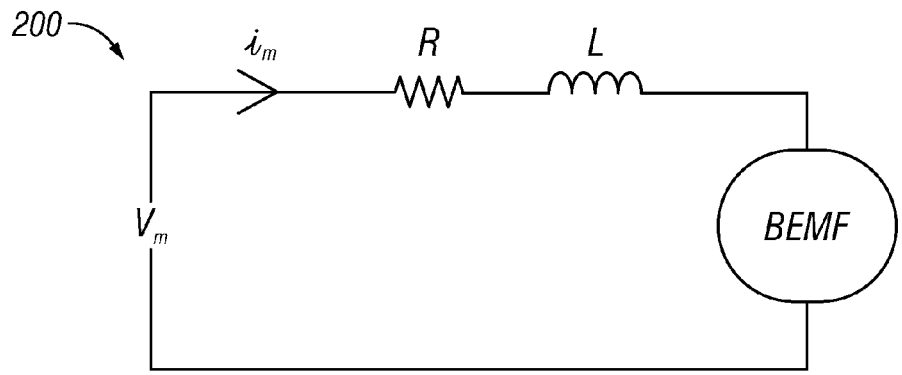
FIG. 2 is an exemplary model diagram of a rotating electric motor in accordance with the present disclosure.

FIG. 2 shows a model 200 for a rotating electric motor. The motor model 200 is shown with a drive voltage Vm, a motor back electro motive force ("EMF") or BEMF (generated voltage), a motor current $i_m$ and series impedances R and L with respective impedance values of r and Lv. A typical permanent magnet motor has three electrical phases that can be converted to a complex voltage via the well-known Clarke transform and back to the winding-centric values with the inverse Clarke transform. Drive voltage Vm, motor current and BEMF are represented by complex values while impedances R and L are represented by real values. The embodiment of the present disclosure provides a simple way to calculate the position of the motor rotor without direct observation and in an accurate way without incurring added loop delay to the control system. Most motor systems are three phase systems, but the motor system provided by the present disclosure applies equally to systems with more than three phases.

Figure 3:
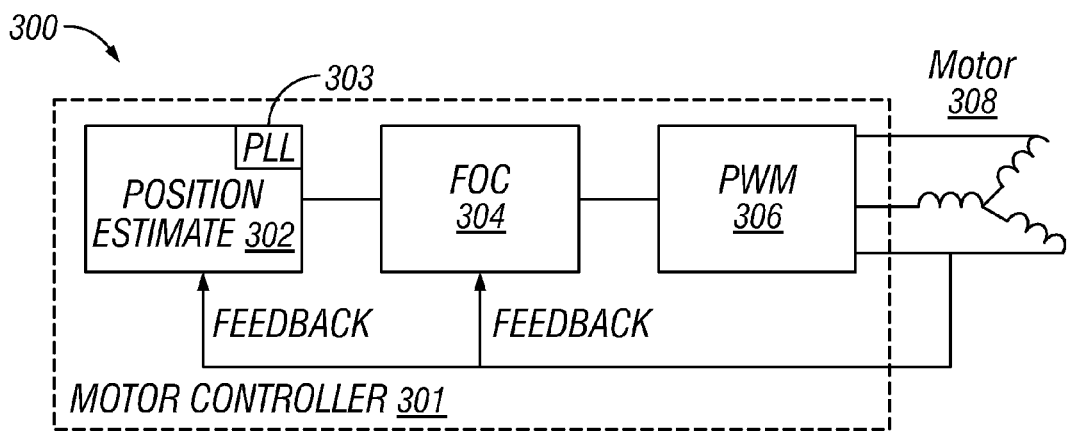
FIG. 3 is an exemplary block diagram of a motor system illustrating motor control at a high level in accordance with the present disclosure.

FIG. 3 shows a motor system 300 that illustrates motor control at a high level in accordance with the present disclosure. The motor system 300 includes a motor controller 301 coupled to motor 308 for controlling motor 308. The motor controller 301 has a position estimate block 302, a field-oriented control (FOC) algorithm block 304, and a pulse width modulation (PWM) controller block 306. The output of the PWM controller block 306 is coupled to the motor 308. Feedback (e.g., motor voltage signals $V_m$ and motor current signals $i_m$) are provided from motor 308 to position estimate block 302. Feedback (e.g., motor voltage signals $V_m$ and motor current signals $i_m$) are also provided from motor 308 to FOC algorithm block 304.

Figure 4:
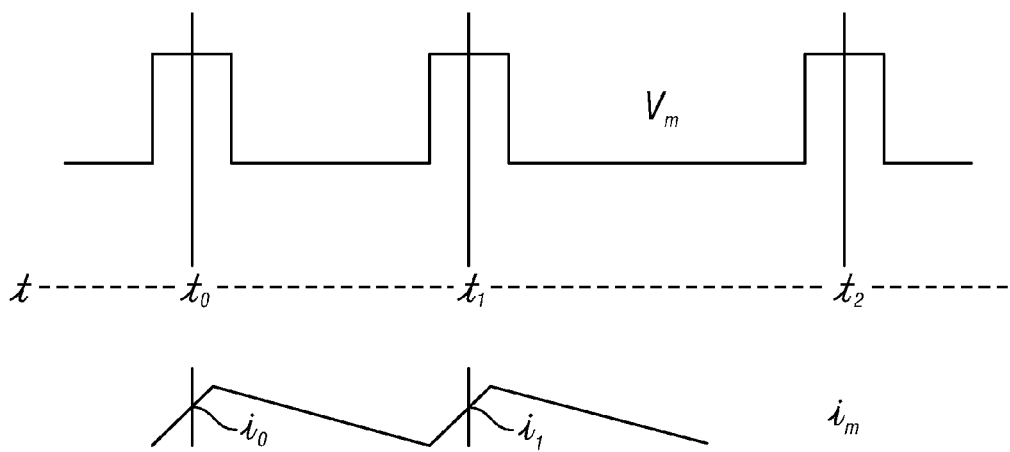
FIG. 4 are exemplary timing diagrams for the motor voltage signal and motor current signal for the motor system at various times in accordance with the present disclosure.

Position estimate block 302 creates a rotor position estimate from the motor voltage signal $V_m$ and motor current signal $i_m$ fed back from motor 308. FIG. 4 shows exemplary timing diagrams for one phase of motor voltage signal $V_m$ and motor current signal $i_m$ at various times t (e.g., $t_0$, $t_1$, and $t_2$). Similar exemplary timing diagrams of course exist for the other two phases of a three-phase motor 308. In one exemplary embodiment, time $t_0$ can be defined as a time when a voltage phase operation started, time $t_1$ can be defined as the present time, and time $t_2$ is a time later than the present time $t_1$, Position estimate block 302 observes the motor current at times $t_0$ and $t_1$. In FIG. 3, the time interval $t_1$-$t_0$ is defined as a sampling interval ts while an approximate sampling period can be defined as the time period between $t_2$ and $t_1$ ($t_2$-$t_1$). Mean voltage Vmm is the mean value of voltage Vm over the sampling period ts. Mean voltage Vmm is derived from model 200 shown in FIG. 2 and, when generally ignoring the small, high order terms, is equal to:

$$Vmm = BEMF\ (\text{average over } t_0 \text{ to } t_1) + r(i_0+i_1)/2 + Lv(i_1-i_0)/ts \quad \text{Equation (1)}$$

Or $$BEMF\ (\text{average over } t_0 \text{ to } t_1) = Vmm - r(i_0+i_1)/2 - Lv(i_1-i_0)/ts \quad \text{Equation (2)}$$

$$BEMFmid = Vmm - r(i_0+i_1)/2 - Lv(i_1-i_0)/ts \quad \text{Equation (3)}$$

Figure 5:
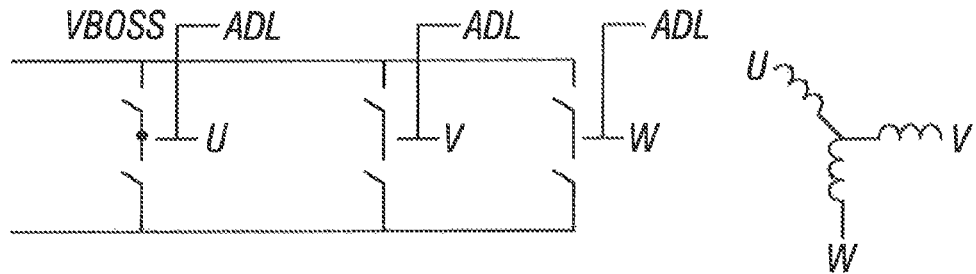
FIG. 5 is an exemplary diagram of an analog-to-digital converter ("ADC") connected to each motor phase in accordance with the present disclosure.

Due to inertia, motor 308 must be turning at a relatively constant rate. Thus, a back EMF value at the middle or midpoint of the PWM cycle ("BEMFmid") can be determined and calculated. The BEMFmid value is defined as the BEMF at time $(t_0+t_1)/2$, and equation 3 shows the calculation of BEMFmid. The BEMFmid value will be very close to BEMF (average over $t_0$ to $t_1$), as the sample rate should be much greater than the electrical period of the motor voltage $V_m$. Mean voltage Vmm can be calculated from the PWM duty cycle and the PWM input voltage, or preferably more accurately from an analog-to-digital converter (ADC) connected to each motor phase (e.g., U, V, W) as shown in FIG. 5. An integrator for the ADC integrates a signal for the average motor voltages at a pulse width modulation (PWM) rate of a PWM drive. The integration performed by the integrator can be done in either analog or digital circuitry. The three observed or calculated values can be transformed to mean voltage Vmm with the Clarke transform/converter, and the motor current can be similarly transformed. Therefore, the rotor position of the motor 308 is able to be determined by a relatively simple calculation (e.g., equations 1 and 2 above).

However, due to the accuracy requirement of the position estimation, and the noise in the motor control system 300, the estimated motor position is noisy. The estimated motor position can be filtered due to the fact that the motor 308 has significant inertia. The appropriate filter is a phase-locked loop (PLO) 303 as shown in FIG. 3.

Figure 6:
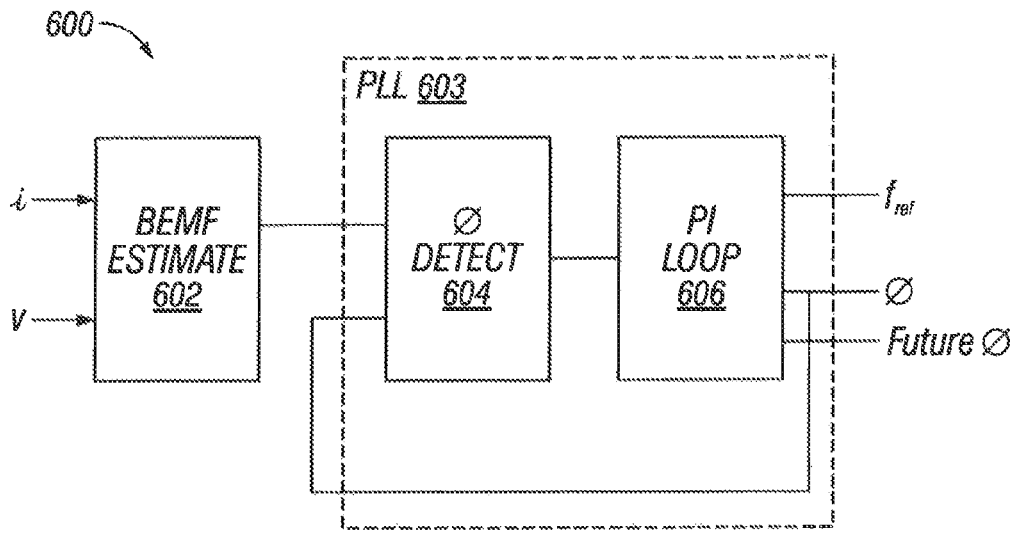
FIG. 6 is an exemplary block diagram of a position estimate block in accordance with the present disclosure.

PLL 303 is used to rotationally smooth the estimated motor position of motor 308, create and derive a speed and phase of motor 308, and from the speed and phase information, calculate a future estimated motor position of motor 308. Referring now to FIG. 6, a position estimate block 600 is shown, and position estimate block 600 is an exemplary embodiment for position estimate block 302 of FIG. 3. Position estimate block 600 comprises a BEMF estimate block 602 and a PLL block 603. BEMF estimate block 602 receives the fed back motor voltage $V_m$ and motor current $i_m$. PLL 603 is an exemplary embodiment of PLL 303 of FIG. 3. PLL 603 has a phase detector 604 and a proportional and integrator ("PI") loop 606. The PI loop 606 outputs reference frequency $f_{ref}$, a present (phase) Ø, and a future (phase) Ø. PI loops are well known in the art for control mechanisms for this type of feedback system.

Figure 7:
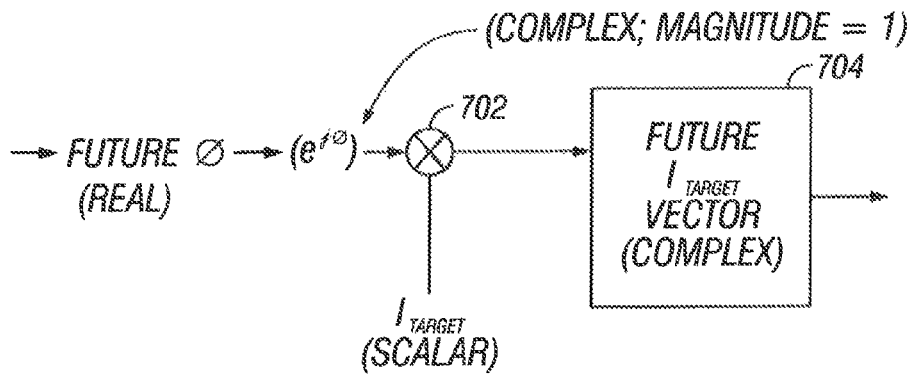
FIG. 7 is an exemplary diagram showing the translation of a future estimated motor position into a future complex number or vector

PLL 603 transitions its complex position input into rotationally smooth phase and rotational speed information. Phase detector 604 first performs the phase comparison and then updates the speed and phase information. The phase comparison is in effect comparing the noisy estimated position (wherein much of the noise for the position comes from the third term $Lv (i_1-i_0)/ts$ of equations 1 to 3) with a rotationally smooth estimated position. Through extrapolation, a future estimated position is able to be predicted and determined. Such a future estimated position can be expressed as a future phase scalar and translated into a future complex number or vector, FIG. 7 shows the translation of such a future estimated position $e^{i\emptyset}$ into a future position expressed in terms of a complex number or vector. A multiplier 702 multiplies the complex future estimated position $e^{i\emptyset}$ with a scalar $I_{target}$ and provides a complex future $I_{target}$ vector 704. This complex vector value is typically used in a current control loop. PLL 603 is built in a robust way and performs a relatively low or lower number of computations. PLL 603 has at its output the phase and speed information of motor 308. Additionally, PLL 603 is capable of outputting an estimated future position of the motor rotor, The following exemplary C++ code implements an update for PLL 603:

wherein:
al and be are the real and imaginary parts of BEMFmid;
pphase is the state variable of the estimated phase of the rotor position, in rotations (360 degrees per rotation);
pllal and pllbe are the real and imaginary parts of the complex projection of pphase (in this case, extracted from a table lookup, many other implementation options exist);
k1 is the P term in the PI control loop;
k2 is the I term (k1, k2 chosen as is well known for loop response speed and stability);
tal, tbe are temporary rotated versions of al and be; In lock, tal is large and positive, tbe has a small magnitude;
Pherr is an approximation to the phase of tbe,tal; Many other approximations are possible too. pfreq is the other state variable, corresponding to the electrical frequency of the motor, w.r.t the sampling rate.
pphase is constrained to a range of 0 to 9 (a single rotation).

After execution of this code, pphase points to the estimated position of the BEMFmid of the next cycle, which is the midpoint of t1 to t2, where t2 is is later than t1. Also, uniform sampling is assumed, which is usually true, but not necessary.

The operation of extracting the phase error then updating the phase allows for an easier look at the position at a future time (e.g., future time look at the position), which is desirable, especially for high-speed operation.

The estimated rotor position at time t2 is:

$$\text{phasenext}=p\text{phase}+p\text{freq}/2-\text{floor}(p\text{phase}+p\text{freq}/2) \quad \text{Equation (4)}$$

Equation 4 provides a convenient, accurate way to set the target current for the next PWM cycle. By calculating the target current for the next current sample during the present cycle, loop delay is minimized and control loop bandwidth improved. The floor function is only a C++ expression showing the modulo behavior of a phase value Ø. If target current $I_{target}$ is the magnitude of the desired current (proportionate to desired torque), for maximum torque/current, the desired (complex) current for the next cycle is:

$$\text{Exp}(2\text{ Pi j phasenext } \emptyset)^* I_{target} \quad \text{Equation (5)}$$

Of course, the same future extrapolation technique can be extended to apply to any future time.

The error between this next current value and the actual current drives the current control loop. The phase detector 604, calculating the phase error in the above Equation 5, makes an approximation that simplifies computation and speeds the lock rate. In the area of +/−45 degrees, it uses a division. Outside of that range, it uses a simple constant based on the sign of the imaginary part. Other techniques could involve an arc tangent, or another approximation to the arc tangent; the feedback system is quite robust. The embodi-

```
void pll::run(double al,double be){    // rectangular BEMF update coordinates
    //update PLL state variable
    //phase detector
    double pllal=costab[int(1024*pphase)];double pllbe=sintab[int(1024*pphase)];
    double tal=pllal*al+pllbe*be;                                                   // this will be
vector with same mag as estbemf
    double tbe=be*pllal-al*pllbe;                                                   // phase equal
to phase error
    pherr=
        tbe>0 && tbe>tal?1:
        tbe<0 && -tbe>tal?-1:
        tbe/tal/6.2830;                                                             // an
approximation to atan. note can be interated, 2pi absorbed into k1 k2
    pfreq+=k2*pherr;
    pphase+=pfreq+k1*pherr;pphase-=floor(pphase);
};
``` ments of the present disclosure provide the following: minimization of loop delay; high accuracy; low computation requirement; advance of the position for the next cycle; and fast lock acquisition.

The BEMF and drive waveforms are normally considered to be sinusoidal for this type of motor drive scheme. If the BEMF calculation is not sinusoidal, corrections for the non-sinusoidal waveform can be made to the phase error calculation to approximate the phase error, taking the waveform into account. The BEMF angle can be extracted with an approximation function that improves the accuracy for non-sinusoidal drive. R has been determined by simulation that addition of a $5^{th}$ harmonic to the BEMF profile is an adequate approximation for all common motors, including trapezoidal BEMF motors (commonly called BLDG motors).

If an averaging ADC is used to determine the phase voltages, preferably one sampling at a much higher rate than the PWM rate (20× to 5000×), the resulting loop can lock to the rotor position at very low speeds. The locking at low speeds is desirable in motor drives, as it allows for low speed, high torque operation, and allows proper drive waveforms to be applied earlier in the start cycle. Such low speed locking can achieve higher efficiency and lower acoustic noise, compared to prior implementations. The ideal data converter for this application (e.g., of obtaining average voltages) is a delta-sigma ADC, with an ADC dedicated to each motor phase. The highly oversampled data captures detail in the drive waveform that is missed by systems sampled at or near the PWM rate.

In general, motors controlled in this manner have three windings or phases. The connections can be wye or delta. The algorithm works the same with other phase combinations, and the Clarke transform/converter must be replaced with a new transform/converter appropriate for the winding pattern.

Although embodiments have been described in detail, it should be understood that various changes, substitutions, and alterations can be made hereto without departing from the spirit and scope of the invention as defined by the appended claims.

What is claimed is:

1. A method of estimating a motor position of a motor, comprising:
    observing motor currents of a motor at two different times;
    determining average motor voltages of the motor between the two different times;
    observing the average motor voltages with an analog-to-digital converter (ADC) that takes at least two samples for one voltage phase of a motor voltage signal during a period between the two different times for the one of the average motor voltages; and
    calculating average back electro motive force (BEMF) values of the motor between the two different times wherein the BEMF values are in conformity with the observed motor currents and the average motor voltages.

2. The method according to claim 1, wherein determining average motor voltages further comprises:
    calculating the average motor voltages from a pulse width modulation (PWM) duty cycle of a PWM drive.

3. The method according to claim 1, wherein an analog integrator for the ADC integrates a signal for the average motor voltages at a pulse width modulation (PWM) rate of a PWM drive.

4. The method according to claim 1, wherein the ADC is a delta-sigma modulator ADC.

5. The method according to claim 1, further comprising:
    observing, by more than one ADC, multiple phases of the motor.

6. ginal) The method according to claim 1, wherein calculating the average BEMF values further comprises:
    calculating a change in the motor current between the two different times.

7. The method according to claim 1, further comprising:
    rotationally smoothing, by a rotational smoother, the average BEMF values.

8. The method according to claim 7, wherein the rotational smoother is a phase locked loop (PLL) filter.

9. The method according to claim 8, wherein the PLL filter further comprises a phase detector and further comprising:
    calculating, by the phase detector, a rotation of each of the average BEMF values through use of a complex rotation value; and
    calculating a phase error based on the rotated value.

10. The method according to claim 9, wherein the phase error is proportionate to an imaginary part divided by a real part of the rotated value.

11. The method according to claim 1 wherein the calculating average back electro motive force (BEMF) values of the motor between the two different times is performed in an integrated circuit.

12. The method according to claim 11 wherein the determining average motor voltages of the motor between the two different times is also performed in the integrated circuit.

13. A system for estimating a motor position of a motor, comprising:
    a field oriented control algorithm block for observing motor currents of a motor at two different times and determining average motor voltages of the. motor between the two different times;
    a position estimator for calculating average hack electro motive force (BEMF) values of the motor between the two different times wherein the BEMF values are in conformity with the observed motor currents and the average motor voltages; and
    an analog-to-digital converter (ADC) that is capable of coupling the system to a motor phase of the motor for observing the average motor voltages wherein the ADC takes at least two samples for one voltage phase of a motor voltage signal during a period between the two different times for the one of the average motor voltages.

14. The system according to claim 13, wherein the field oriented control algorithm block determines average motor voltages by calculating the average motor voltages from a pulse width modulation (PWM) duty cycle of a PWM drive.

15. The system. according to claim 13, wherein the ADC further comprises an analog integrator for integrating a signal for the average motor voltages at a pulse width modulation (PWM) rate of a PWM drive.

16. The system according to claim 13, wherein the ADC is a delta-sigma modulator ADC.

17. The system according to claim 13, further comprising:
    at least two ADCs, that are capable of respectively coupling the system to the motor phases of the motor, for observing multiple phases of the motor.

18. The system according to claim 13, wherein the position estimator in calculating the average BEMF values further calculates a change in the motor current between the two different times.

19. The system according to claim 13, wherein the position estimator further comprises:
    a rotational smoother for rotationally smoothing the average BEMF values.

20. The system according to claim 19, wherein the rotational smoother is a phase locked loop (PLL) filter.

21. The system according to claim 20, wherein the PLL filter further comprises:
   a phase detector for calculating a rotation of each of the average BEMF values through use of a complex rotation value and calculating a phase error based on the rotated value.

22. The system according to claim 21, wherein the phase error is proportionate to an imaginary part divided by a real part of the rotated value.

23. The system according to claim 13, wherein the position estimator is in an integrated circuit.

24. The system according to claim 23, wherein the field oriented control algorithm block is in the integrated circuit.

* * * * *